United States Patent [19]

Lichti

[11] 4,110,859
[45] Sep. 5, 1978

[54] PASSENGER LOADING RAMP

[76] Inventor: Robert D. Lichti, 3318 Warwood Rd., Lakewood, Calif. 90712

[21] Appl. No.: 849,502

[22] Filed: Nov. 7, 1977

[51] Int. Cl.$^2$ .............................................. E01D 1/00
[52] U.S. Cl. .................................................. 14/71.5
[58] Field of Search ..................... 14/71.5, 71.1, 71.3, 14/71.7

[56] References Cited

U.S. PATENT DOCUMENTS

| | | | |
|---|---|---|---|
| 3,358,308 | 12/1967 | Henchbarger | 14/71.5 |
| 3,377,638 | 4/1968 | Seipos | 14/71.5 |
| 3,378,868 | 4/1968 | Wollard | 14/71.5 |
| 3,404,417 | 10/1968 | Wollard | 14/71.5 |
| 3,422,477 | 1/1969 | Riggles | 14/71.5 |
| 3,538,528 | 11/1970 | Porter | 14/71.5 |
| 3,561,030 | 2/1971 | Seipos | 14/71.5 |
| 3,588,934 | 6/1971 | Van Marle | 14/71.5 |
| 3,793,662 | 2/1974 | Gacs | 14/71.5 |
| 3,808,626 | 5/1974 | Magill | 14/71.5 |
| 3,839,760 | 10/1974 | Nagy | 14/71.5 |

Primary Examiner—Nile C. Byers

Attorney, Agent, or Firm—Fulwider, Patton, Rieber, Lee & Utecht

[57] ABSTRACT

There is disclosed a passenger loading ramp for transfer of passengers between a terminal and an airplane parked in a parking station adjacent thereto. Adjacent the terminal is a swing support post including means for accommodating swinging about a vertical axis. A rigid passenger walkway is carried on one end from such swing post by means of a horizontally extending pivot and projects to the parking station. An elevating post is disposed intermediate the swing post and parking station for adjusting the elevation of the free extremity of the walkway and includes a gear rack arrangement for swinging the walkway laterally relative thereto. A cab is suspended from the free extremity of the walkway by means of a parallelogrammatic linkage which is coupled with the swing post and operative to maintain the cab floor level irrespective of the elevation of the free extremity of such walkway. The cab includes a laterally opening doorway for mating with the entry door of a vehicle parked in such parking station upon lateral swinging of the walkway.

13 Claims, 10 Drawing Figures

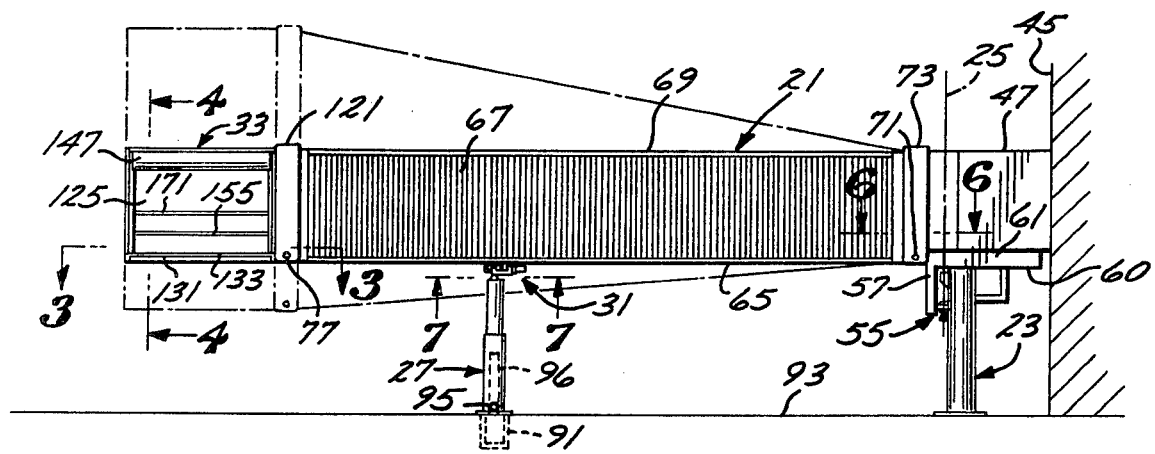
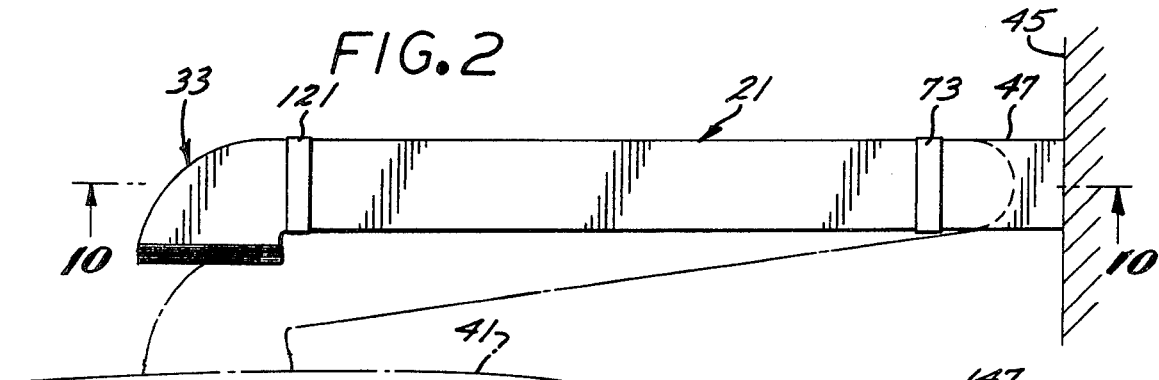
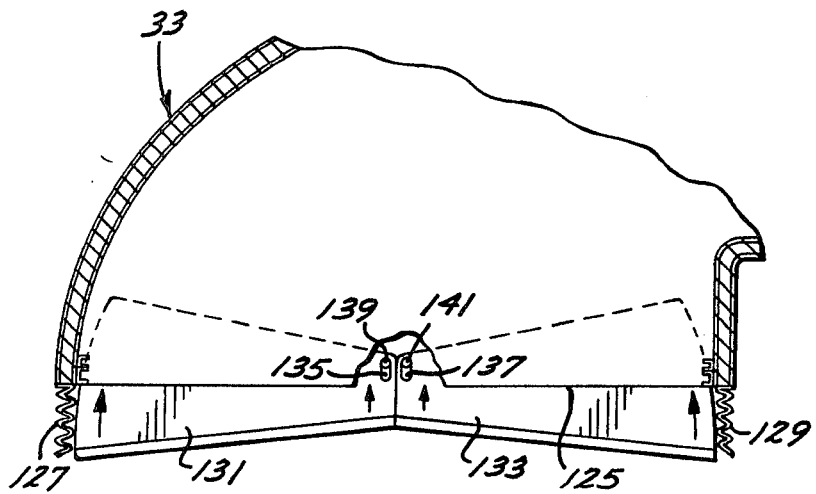
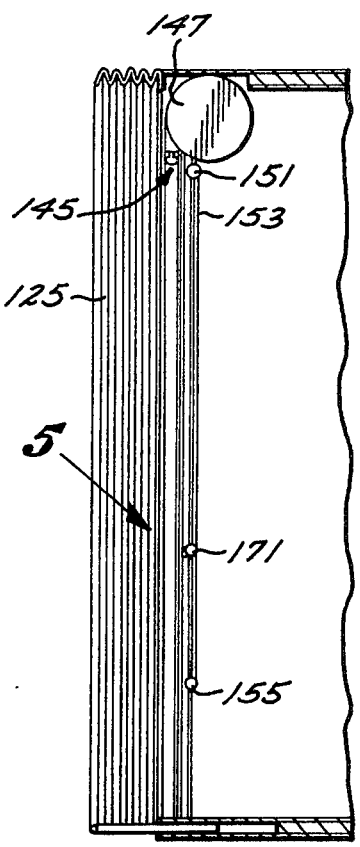

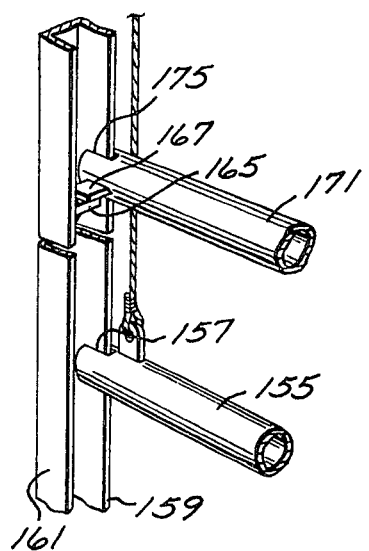
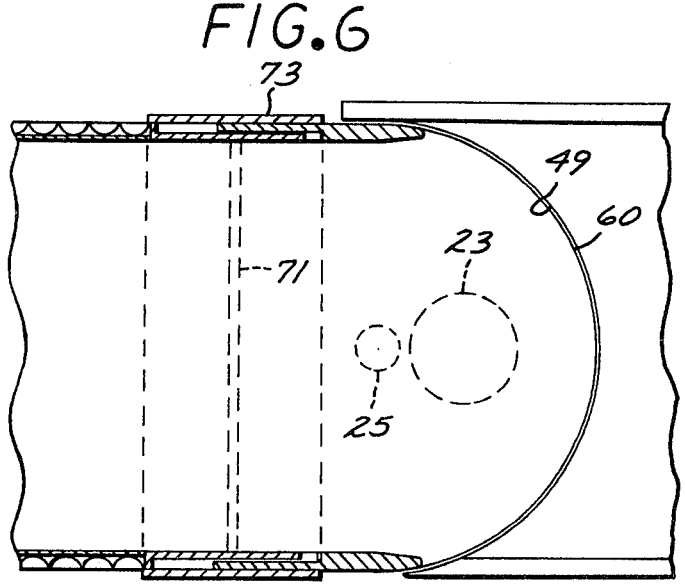
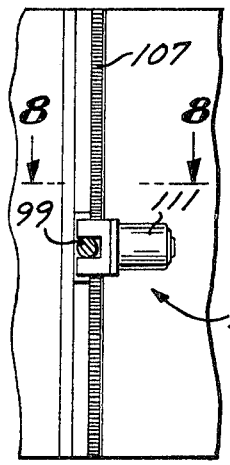
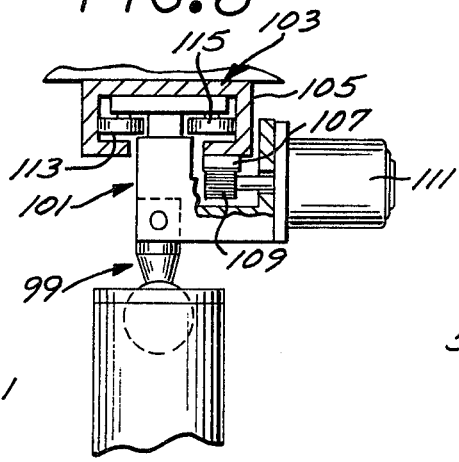
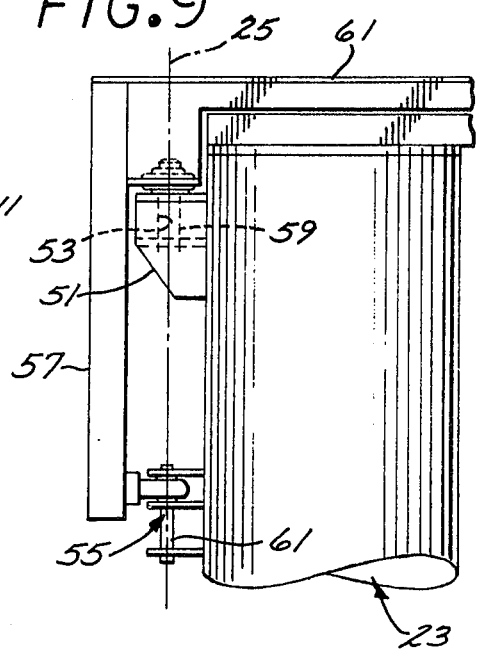
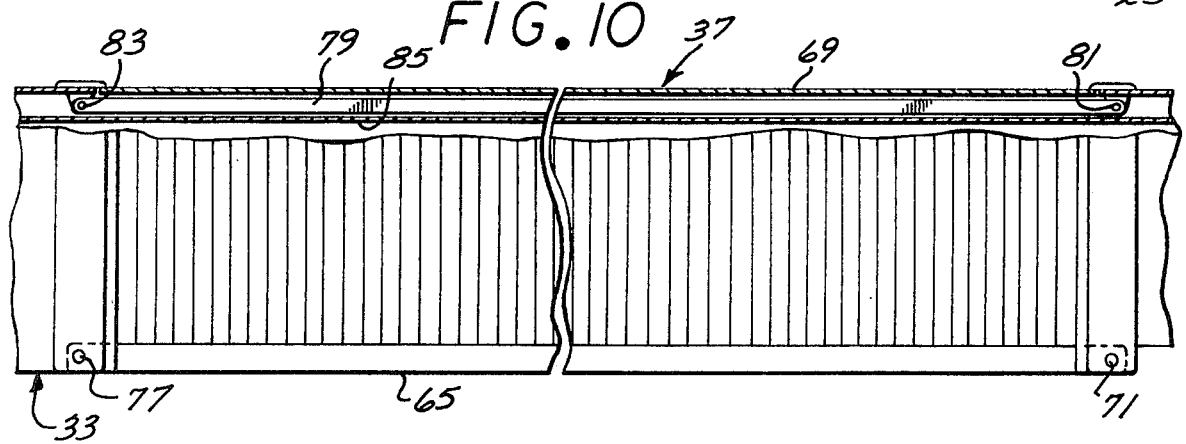

PASSENGER LOADING RAMP

BACKGROUND OF THE INVENTION

1. Field of the Invention

The passenger loading ramp of the present invention relates generally to ramps for transferring passengers between a terminal and transporting vehicle, and particularly to an airplane loading ramp for selective mating with the entry door of various airplanes having entry doors disposed at different elevations.

2. Description of the Prior Art

With the advent of modern day transportation calling for rapid transfer of passengers between airport terminals and aircraft, numerous different designs have been proposed for loading ramps. Efforts have been made to accommodate the varying elevations of the different models of aircraft so the same ramp can be utilized, as for example, with a Boeing 707, 727, 737, 747, Douglas DC-8, 9 and 10 and Lockheed L-1011. Such loading ramps conventionally provide rigid covered walkways or bridges extending from the terminal and incorporating telescopical or accordian sections to enable the ramp to be extended longitudinally to mate a suspended cabin with the aircraft entry door. However, loading ramps of this nature have proven to be prohibitively expensive to manufacture and maintain. Great demand exists for a relatively inexpensive passenger loading ramp which can accommodate the numerous different models of aircraft currently in use in the travel industry and contemplated for future use.

SUMMARY OF THE INVENTION

The passenger loading ramp of the present invention is characterized by a rigid loading ramp carried on one extremity from a swing post which provides for swinging for such ramp about a vertical axis and connected with the ramp itself by means of a horizontally extending pivot. Elevating means is provided for raising and lowering the free extremity of such ramp about the horizontal pivot and an aircraft mating cab is suspended from the free extremity of the walkway by leveling means operative upon adjustment of the elevation of the free extremity of the walkway to maintain such cab level.

These and other features of the invention will become apparent when taken in consideration with the following detailed description of the drawings.

DESCRIPTION OF THE DRAWINGS

FIG. 1 is a side elevational view of a passenger loading ramp incorporating the present invention;

FIG. 2 is a top plan view of the passenger loading ramp shown in FIG. 1;

FIG. 3 is a partial horizontal, longitudinal sectional view, in enlarged scale, taken along the line 3—3 of FIG. 1;

FIG. 4 is a vertical transverse sectional view, in enlarged scale, taken along the line 4—4 of FIG. 1;

FIG. 5 is a broken detailed view, in enlarged scale, taken from the area designed 5 in FIG. 4;

FIG. 6 is a horizontal sectional view, in enlarged scale, taken along the line 6—6 of FIG. 1;

FIG. 7 is a horizontal sectional view, in enlarged scale, taken along the line 7—7 of FIG. 1;

FIG. 8 is a vertical sectional view, in enlarged scale, taken along the line 8—8 of FIG. 7;

FIG. 9 is a detailed view, in enlarged scale, taken from the area designated 9 in FIG. 1; and FIG. 10 is a vertical sectional view, in enlarged scale, taken along the line 10—10 of FIG. 2.

DESCRIPTION OF THE PREFERRED EMBODIMENT

Referring to FIGS. 1, 2 and 10, the passenger loading ramp of the present invention includes, generally, a rigid covered walkway 21 carried on one end from a swing post 23 (FIG. 3) for swinging thereof about a vertical axis 25 and projecting over an upstanding elevating post 27 which raises and lowers the free extremity of such walkway. A transversely extending swing track carries the walkway 21 on the post 27 and an airplane mating cab, generally designated 33, is carried from the free extremity of the walkway 21 by means of a parallelogrammatic linkage, generally designated 37 (FIG. 10). Consequently, the walkway 21 may be swung transversely to the retracted position shown in solid lines in FIG. 2 and an aircraft 41 moved into a parking station adjacent the side thereof, the elevating post 27 actuated to raise the cab to the level of the airplane entry door and the swing drive 33 actuated to swing such cab 33 laterally about the swing axis 25 to the broken line position shown in FIG. 2 mating with the plane entry door.

Referring to FIG. 1, airplane terminals 45 are normally constructed with departure gates of various designations and having short bridge tunnels projecting therefrom. My tunnel 47 incorporates a floor terminating in a semicircular cutout 49 (FIG. 6) having a diameter corresponding with the width of the walkway 21. Rather than incorporating a relatively massive and expensive swing spindle of a diameter corresponding with that of the swing post 23, my invention contemplates use of a moderately sized swing pivot construction including swing support bracket 51 (FIG. 9) mounted on the front side of the swing post 23 and incorporating a vertical bore 53. A support clevis, generally designated 55, is mounted from the front side of such post in vertical alignment with the bracket 51 and a support plate 57 is mounted from such bracket 51 and clevis 55 by means of respective vertically aligned pivot pins 59 and 61 which define the swing axis 25. The support plate 67 supports semicircular turntable 60 (FIG. 6) which overlies the swing post 23 and is received in the semicircular cutout 49.

The walkway 21 is formed with a rigid support floor 65, opposed walls 67 and a top wall 69 (FIG. 1). One end of the floor 65 is carried from the turntable 60 by means of a horizontally extending pivot rod 71 (FIG. 1) and the sides and top of such walkway are covered at their juncture with the bridge 47 by means of a peripheral cowling 73.

Referring to FIG. 10, the cab 33 is suspended from the free extremity of the walkway 21 by means of the parallelogrammatic linkage 37 with the bottom link being formed by the bottom wall 65 which is carried on one end from the horizontal pivot rod 71 and is connected on its opposite end with the bottom of such cab by means of a horizontal pivot rod 77. The top of the cab 33 is carried from the top of the bridge 47 by means of a top parallelogrammatic link 79 which is connected with such bridge on one extremity by means of a horizontal pivot rod 81 and is connected on its opposite extremity with such cab by means of a horizontal pivot rod 83. The top link 79 is housed beneath the top wall 69 of the walkway concealed from view by passengers walking therebeneath by means of a false ceiling 85.

Referring to FIGS. 1 and 8, the elevating post 27 stands on a base 91 anchored in the walkway 93 and incorporates a transversely extending swivel joint 95 in its lower extremity and is in the form of a telescopical post incorporating a hydraulic piston 96 for telescopical extension and retraction thereof. Referring to FIGS. 7 and 8, a universal ball joint 99 is mounted in the top of the post 27 and a swing carriage, generally designated 101, is mounted thereon and incorporates a slider truck, generally designated 103, received with a C-channel track 105 projecting transversely beneath the walkway 21. Mounted under one channel of the C-channel track 105 is a transversely extending gear rack 107 having a drive pinion 109 of a swing drive motor 111 meshed therewith. The drive motor 111 is carried from the swing carriage 101. The follower truck 103 includes spaced apart rollers 113 and 115 received within the C-channel track 105 to guid such truck therein during transverse swinging of the walkway 21.

Referring to FIGS. 1 and 3, the cab 33 is elbow-shaped and is covered on its sides and top and includes a cowling 121 telescoped over the sides and top of the free extremity of the walkway 21 and opens laterally in a doorway 125 which is bordered on its sides by accordian curtains 127 and 129 and has its bottom floor in the form of dual walls spaced apart for receipt therebetween of fan-shaped slider compensators 131 and 133 which compensate for the different fuselage contours of various aircraft. The slider compensators 131 and 133 are disposed end-to-end and are formed in their inner respective extremities with respective slots 135 and 137 which receive respective slider pins 139 and 141 mounted from the cab floor and are secured on their outer extremities to the accordian curtains 127 and 129 and are normally gravity held at their outer positions.

Referring to FIG. 4, a retractable curtain, generally designated 145, is carried from a retractor 147 mounted above the doorway 125 for selective extension to cover such doorway and for retraction therefrom.

Also mounted above the doorway 125 is a safety rail retractor 151 having a pair of safety rail suspension cables 153 projecting downwardly therefrom. Referring to FIGS. 4 and 5, the cables 153 are connected on their lower extremities with the opposite ends of a lower safety rail 155 which is formed at its opposite extremities with longitudinally outwardly opening vertical slots 157 received over respective flanges 159 of channels 161 mounted on opposite sides of such doorway to define tracks for such rails.

A control panel (not shown) is mounted in the cab so an operator can control swinging and elevating of such cab as well as opening of the doorway curtain 145 and raising of the safety rails 155 and 171.

With continued reference to FIG. 5, stop tabs 165 are mounted from the channels 161 opposite the track flange 159 and project therefrom and into the vertical path of respective stop tabs 167 mounted from the opposite extremities of an upper safety rail 171 to limit downward travel thereof. The upper safety rail 177 is also slotted at its opposite extremities to form slots 175 also received over the respective track flanges 159. Consequently, when the retractor 151 is actuated to retract the cables 153 they will lift the lower rail 155 bringing it into contact with such upper rail to carry it upwardly to a retracted position above the doorway 125.

In operation, the passenger loading ramp of the present invention may easily be installed at an airport terminal 45 by merely anchoring the swing and elevating posts 23 and 27 in the runway 93 adjacent a parking station for various aircraft 41. When it is desirable to load a smaller aircraft having a relatively low elevation entry door, the swing drive motor 111 (FIG. 8) is actuated to swing the walkway 21 away from the viewer in FIG. 2 to the retracted solid line position. The smaller aircraft is then brought into the parking station as depicted by the fantom outline 41 and the operator of the ramp may ride in the cab 33 for convenient operation and view of the aircraft entry door and may actuate the hydraulic piston 96 controlling telescoping of the post 27 to lower such post thereby lowering the cab 33 to a vertical alignment with the entry door.

Referring to FIG. 10, it will be appreciated that as the free extremity of the walkway 21 is lowered, the parallelogrammatic linkage 37 will operate to maintain the floor of the cab 33 level irrespective of adjustments in elevational angling of the walkway 21. This unique feature provides a relatively inexpensive and foolproof mechanism for assuring a level cab floor for proper alignment with the aircraft entry door and for foot traffic thereover. The curtain 145 is retracted and the safety rails 155 and 171 raised to clear the doorway 125.

The operator may actuate the drive motor 111 to drive the pinion 190 along the gear rack 107 to swing the walkway 121 toward the viewer as viewed in FIG. 2. to mate the cab with the fuselage surrounding the entry door. It will be appreciated that as contact is made with the fuselage below the entry door, the compensators 131 and 133 will float back into the cab floor to a degree and orientation is dictated by the particular longitudinal contour of the fuselage. The unloading ramp is then ready for receiving passengers from the aircraft.

When the unloading operation has been completed and, if desirable, the aircraft reloaded, the operator will actuate the drive motor 111 (FIG. 8) to again retract the walkway 121 to its retracted solid line position shown in FIG. 2. Subsequently, when a larger aircraft is parked at the parking station, the operator of the loading ramp will merely actuate the hydraulic piston 96 controlling telescoping of the elevating post 27 to raise the walkway 21 to elevate the cab 33 to a level aligned with the elevation of the aircraft entry door. The cab 33 may then be mated with the entry door of such aircraft for transfer of passengers to and from the passenger area therefrom.

From the foregoing, it will be apparent that the passenger loading ramp of the present invention provides a relatively straightforward and inexpensive means for mating a ramp cab with aircraft entry doors of various models of aircraft and assuring the proper cab orientation irrespective of the elevation of the aircraft entry door.

Various modifications and changes may be made with regard to the foregoing detailed description without departing from the spirit of the invention.

I claim:

1. A passenger loading ramp for transferring passengers between a terminal and a craft at a parking station spaced a selected distance therefrom and comprising:
    a first support adjacent said terminal;
    a second support disposed intermediate said first support and said parking station;

a rigid walkway projecting from said first support, over said second support and to said selected location;

cover means covering said walkway;

mounting means for mounting one end of said walkway from said first support and including vertical and horizontal pivot means for pivoting about respective vertical and horizontal axes;

elevating means on said second support for pivoting said walkway about said horizontal axis for raising and lowering the free extremity of said walkway;

swing means coupled with said walkway and including swing drive means for pivoting said walkway about said vertical axis;

a cab carried in cantilever fashion from said free extremity of said walkway and including a doorway opening to one side thereof to mate with a craft parked at said parking station; and leveling means coupled between said first support and cab and responsive to rotation of said walkway about said horizontal pivot axis to maintain said cab level whereby said swing drive means may be actuated to rotate said walkway about said vertical axis and swing said free extremity and said cab to one side of said parking station, said craft driven into said station, said elevating means actuated to pivot said walkway about said horizontal axis to adjust said cab to the desired level for said craft and said swing drive actuated to swing the free extremity of said walkway toward said craft to mate therewith.

2. A passenger loading ramp as set forth in claim 1 wherein:
said second support includes a vertically telescopical post; and
said elevating means includes means for telescoping said post.

3. A passenger loading ramp as set forth in claim 1 wherein:
said swing means includes a transversley extending gear rack under said walkway over said second support and said swing drive means includes a drive motor and pinion mounted on said second support and meshed with said gear rack.

4. A passenger loading ramp as set forth in claim 1 wherein:
said first support includes a vertical post; and
said mounting means includes a bracket projecting from one side thereof and formed with a vertically projecting bore, said mounting means further including a pivot pin on said walkway and received in said bore.

5. A passenger loading ramp as set forth in claim 1 wherein:
said swing means includes transversely extending gear means mounted under said walkway over said second support and said swing drive means is mounted on said second support and wherein:
said second support includes a vertically projecting post including pivot means for articulation about a horizontal axis to provide for articulation of said post as said walkway is raised and lowered.

6. A passenger loading ramp as set forth in claim 5 wherein:
said post includes second pivot means spaced vertically from said first-mentioned pivot means for articulating about a second horizontal axis.

7. A passenger loading ramp as set forth in claim 1 wherein:
said cab includes a floating faring border extending about, at least, a portion of the periphery thereof and suspension means for suspending said border from said cab for floating relative thereto for retraction with respect thereto to accommodate different contour of different aircraft.

8. A passenger loading ramp as set forth in claim 1 wherein:
said leveling means includes parallelogrammatic linkage means connected between said first support and said cab.

9. A passenger loading ramp as set forth in claim 8 wherein:
said parallellogrammatic linkage includes said horizontal pivot means, said walkway, a suspension link disposed above said walkway and extending parallel thereto, a vertically projecting cowling mounted rigidly on said first support means and respective second, third and fourth horizontal pivot means connecting said cowling with one end of said link, the opposite end of said link with the top of said cab and the free extremity of said walkway with the bottom of said cab, respectively.

10. A passenger loading ramp as set forth in claim 1 wherein:
said swing means includes a downwardly opening channel track mounted under said walkway and extending transversely thereto; and
said drive means includes a follower truck mounted from said second support and received in said truck.

11. A passenger loading ramp as set forth in claim 1 that includes:
a curtain in said doorway of said cab; and
means mounted in the top of said opening and carrying said curtain for raising and lowering thereof in said doorway.

12. A passenger loading ramp as set forth in claim 1 that includes:
a safety rail in said doorway opening of said cab; and
means mounted in the top of said foorway and connected with said safety rail for selectively raising said rail above a walkway defined through said doorway and for lowering said railing to extend across said walkway.

13. A passenger loading ramp as set forth in claim 1 wherein:
said cab includes a pair of vertical tracks disposed on opposite sides of said doorway, upper and lower hand rails disposed above one another, respectively, and projecting horizontally across said doorway and slidably received at their opposite extremities on said respective tracks, a pair of stop tabs mounted on the opposite ends of said upper rails, a pair of stops mounted on said tracks and midway up said doorway and below said upper rail and projecting into the path of said stop tabs as said upper rail travels down said tracks, and suspension means mounted in the upper part of said doorway, connected with lower rail and including retraction means for drawing said lower rail upwardly to engage said upper rail and carry them both upwardly to an elevated position in said doorway.

* * * * *